INVENTOR.
ROY B. EVERSON

July 28, 1953

R. B. EVERSON 2,647,083

MEANS FOR DIRECT FEED AUTOMATICALLY PROPORTIONING OF CHLORINE GAS

Filed Jan. 9, 1950

*INVENTOR.*
ROY B. EVERSON

Patented July 28, 1953

2,647,083

UNITED STATES PATENT OFFICE 2,647,083

MEANS FOR DIRECT FEED AUTOMATICALLY PROPORTIONING OF CHLORINE GAS

Roy B. Everson, Chicago, Ill.

Application January 9, 1950, Serial No. 137,624

2 Claims. (Cl. 210—2)

This invention relates generally to the disinfection of the effluent from a sewage treatment plant prior to the emptying of such effluent into a stream, river or lake. The present improvements are directed to means which will effectively treat the effluent with chlorine gas which is automatically proportioned for direct feed into such plant effluent so that it may be safely discharged into a river or other body of water. Regardless of the disinfection treatment to which sewage may be subjected, disinfection of the sewage effluent, prior to the discharge from the plant, is now regarded as a necessity. Protection of water supplies, bathing places and shell fish propagation beds requires that waterborne disease bacteria must be eliminated. That chlorination offers the one practical and effective means of sewage disinfection is now universally acknowledged by sanitation engineers and public health authorities.

It is a primary object of this invention to provide a novel apparatus or assembly of the type contemplated herein that is not complicated in construction but is simple to operate and is quite effective in performing its functions.

Heretofore, many of the systems utilized for chlorine control have been characterized by depending upon manual control. It is, therefore, another object of the present improvements to provide a purification system which operates in a wholly automatic manner after the certain controls or metering devices have been set so that the purifying agent will thereafter be discharged at the point of application in a controlled amount which is in proper proportion to the effluent flow from the sewage treatment plant.

In this connection it will be observed that the chlorine gas or other purifying agent which is at high pressure upon leaving a source of supply, passes through pressure reducing means, and thence through regulating means which is determined by the liquid level in the still-well or quiescent pool to properly proportion the amount of the gas or purifying agent to be directly fed into the liquid which is slowly moving in the channel or conduit. Prior to delivery into the moving channel of water, the purifying agent flows through the visual metering means where the rate of flow is indicated, and then into a conduit having an expansion chamber therein which directly feeds the purifying agent to the point of application in the moving channel. For the purpose of preventing too rapid delivery at the point of application the purifying agent passes through a porous diffusing media submerged in the slowly moving current of water in the channel at the point of application.

Additional objects, aims and advantages of the improvements contemplated herein will be apparent to persons skilled in the art after understanding the construction and operation of the arrangement herein disclosed for automatically proportioning a direct feed of chlorine or other purifying gas. Reference is now made to the accompanying drawings, forming a part of this specification.

In the drawings.

The drawings are to be understood as being of a generally schematic or a diagrammatic character for the purpose of disclosing a typical or preferred form of the invention contemplated herein, and in these drawings like reference characters identify the same parts in the different views.

Figure 1:
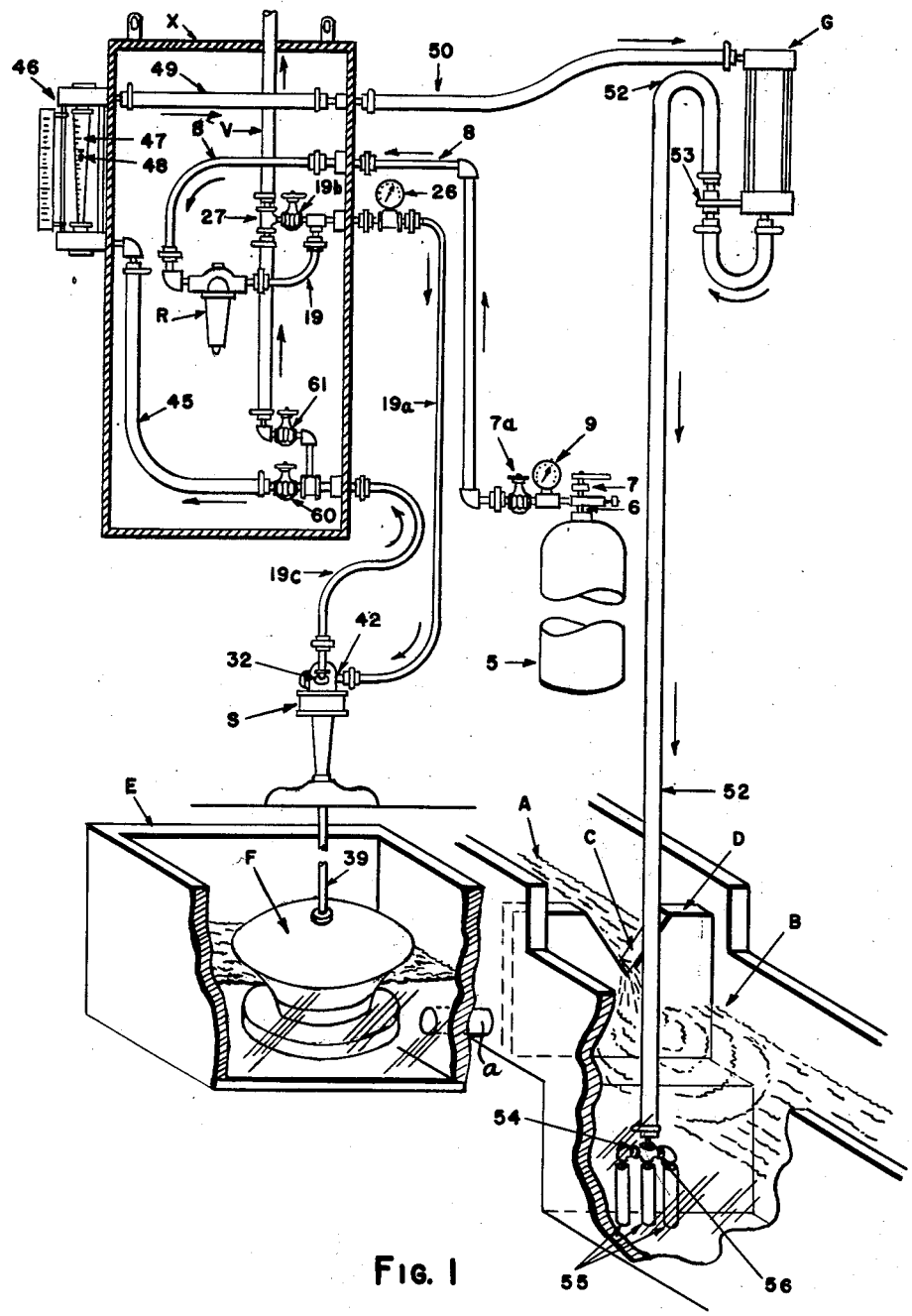
Fig. 1 is a schematic lay-out of the invention contemplated herein.

Referring particularly to Fig. 1, A schematically illustrates an effluent flume from a sewage treatment plant which is to be purified or treated, and B similarly represents a channel of slowly moving water into which the flume A discharges liquid through a recess or notch C in the upper region of a dam or weir D. The recess C as shown is of a V-shape and is tapered downward as shown, with the result that the higher the level of liquid in flume A the larger the volume of liquid moved through recess C and discharges into the moving channel B. The arrangement above described is merely typical of many variations which may be made in the present arrangement, depending upon surrounding conditions and particular requirements at the site or location where the purification system is installed. For example, in lieu of recess C the weir D may have one or more rows of perforations or apertures made transversely therein to perform the same function as recess C. However, it is preferred in the present instance to provide the recess or notch in the upper portion of the weir as shown in order to prevent clogging which might result from the use of apertures or performations. In carrying out the present improvements the supply of chlorine is fed from a high pressure tank through suitable conduit means to a reducing valve assembly R where the pressure is decreased or lowered and this low pressure gas continues in the conduit means to a regulating and shut-off valve assembly S which is operatively responsive to the level of liquid in a still-well or quiescent pool E communicating with flume A through pipe $a$ back of the weir D. This valve assembly S permits a proper proportion of the gas to continue through the conduit system in accordance with the requirements at the point of application. Continuing from valve assembly S the conduit system passes this proportioned volume of gas through a gas flow control valve 60 which is normally set for the maximum chlorine dosage for maximum sewage effluent flow through flume A and thence to a visual gauge where the attendant may note the volume and speed of the gas as it moves along the conduit system to an expansion chamber assembly G from which the gas is delivered to the moving water channel B through diffuser means which are submerged therein. At all times the gas is within a continuous conduit system extending from the gas cylinder 5 to the point of application and the above-mentioned accessories are interposed in the piping which defines the conduit system.

The means herein shown for automatically proportioning a direct feed of chlorine gas comprises a cylinder 5 which is charged with chlorine gas under high pressure and has a discharge stub 6 provided with a release valve 7 which is opened after the cylinder has been coupled to the conduit 8 leading to a pressure reducing valve assembly R. There is a pressure gauge or indicator 9 in conduit 8 adjacent the release valve 7, and beyond the gauge there is a shut-off valve 7a. As shown, the conduit 8 enters a cabinet X within which the reducing valve assembly R and certain other portions of the control system are conveniently housed.

Figure 2:
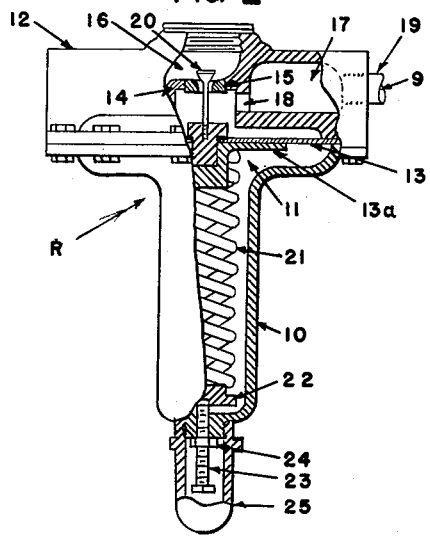
Fig. 2 is a sectional view of the pressure reducing valve employed herein.

The pressure reducing valve R performs the function of supplying gas to the succeeding portion of the system at a reduced constant pressure regardless of the pressure existing in the gas supply cylinder 5. This valve as shown in detail in Fig. 2, preferably comprises a tubular housing section 10 having a flared end portion defining a chamber 11, and a cap or closure section 12 which is bolted to the flared portion to secure a flexible diaphragm 13 between these sections. The capped section 12 is divided by a wall 14 having an aperture therein to receive bored valve seat member 15, said wall 14 providing a high pressure chamber 16 to which conduit 8 connects, and a low pressure chamber 17 communicating with the first chamber through the bore of valve member 15 and an aperture 18 in said wall. Low pressure chamber 17 discharges into the low pressure conduit 19. The diaphragm 13 supports the spindle of the valve head 20, and said diaphragm is yieldably backed by force exerting means or spring 21 in the tubular housing section 10, the opposite end of which spring engages a bearing plate 13a. The tension of said spring is nicely regulated by means of adjusting bolt 23 threaded through the end wall of tubular lower section 10, said bolt being held by the lock nut 24 which is enclosed within a cup 25 removably threaded on the housing 10 to protect these parts and to prevent tampering therewith. The gas in conduit 8 from the supply cylinder enters chamber 16 of valve assembly R and travels through the valve 20 into the communicating low pressure chamber 17, and the pressure of the gas is effective on diaphragm 13 in opposition to the spring means 21 to move the valve 20 thus controlling the volume and pressure of gas which is discharged from the low pressure side 17 of the valve R into the communicating conduit 19.

The low pressure conduit 19 has a main branch 19a leading to the proportioning regulator and shut-off valve assembly S, which is similar to that shown in Everson Patent No. 2,258,485, and is responsive to the level of liquid in the still-well or quiescent pool E through the medium of a control float F therein. There is a gauge 26 in this main branch conduit 19a, and there is a second branch 19b of the low pressure conduit which leads through a T connection 27 to a blow-off vent pipe V discharging into the atmosphere outside the cabinet X. This blow-off is used to relieve the static chlorine gas pressure within the sterelator whenever it is shut down for servicing any part of it.

Figure 3:
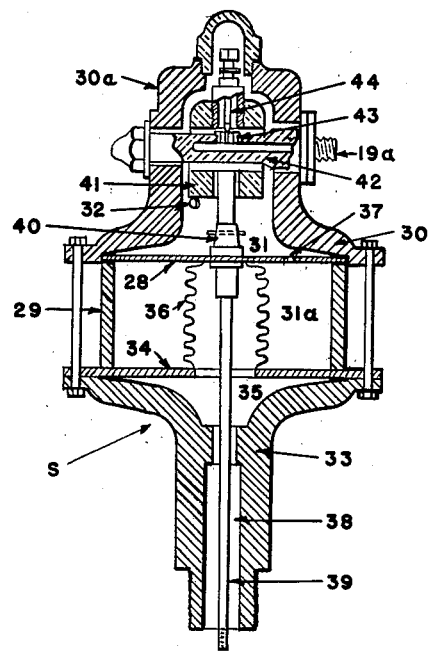
Fig. 3 is a similar view of a regulating or proportioning valve.

The regulating valve assembly S shown in Fig. 3 comprises a flexible diaphragm 28 clamped between a cylindrical wall 29 and a top housing member 30 to define therewith an upper chamber 31 which receives the low pressure gas from the main branch conduit 19a through the bore of valve seat 43 in tube 42 to an inlet to which said branch conduit 19a is coupled as seen in Fig. 1. The lower housing 33 receives the lower edge of the cylinder 29 upon a platform 34 that has a central opening 35 therein, and there is an expandible bellows 36 seated on and sealed to the platform 34 in surrounding relation to said opening 35, and the bellows upper end is sealed to the underside of diaphragm 28. This arrangement provides a second or lower chamber 31a which is in communication with the other or upper chamber through a bleed hole 37 in the diaphragm 28 thereby eliminating valve chatter. The interior of the bellows 36 is in open communication with the atmosphere through the center opening 35 and through the hollow lower portion of housing 33 which is defined by an axial bolt 38.

As will be seen in Fig. 1, the proportioning regulator valve assembly is preferably in a position which is axially aligned with float F and the diaphragm 28 of the valve assembly is connected by a thrust guide rod 39 to the top of said float so that variation of the liquid level in the still-well E will correspondingly move said diaphragm 28. A post 40 secured to the top of diaphragm 28 carries a cylindrical yoke 41 which surrounds the horizontal inlet tube 42 to which the main portion conduit 19a is coupled, said tube and yoke being within the hollow dome 30a of the top housing member 30. The inlet tube has the valve seat 43 in its upper side and the yoke carries a needle valve 46 aligned with the bore of said seat 43 for coaction therewith. In operation, the low pressure chlorine gas entering the valve assembly S through the inlet tube 42 is discharged through the valve seat 43 into both the dome 30a and the chamber 31 in a controlled manner which is proportioned according to the level of liquid in the still-well E. The gas then passes out of valve assembly S through the outlet port 32 into the conduit 19c and gas flow control valve 60 which is a continuation of main branch conduit 19a. Thus, if the still-well level is high, the volume of gas is increased, and when the still-well level falls below the minimum the valve needle 44 will completely seat and cut off the flow of gas to the conduit 19c and with the result that the portion of the system which is beyond the valve asembly S will become inoperative. The gas leaving the valve assembly S is still under low pressure but its volume or rate of flow has been desirably regulated to a predetermined rate which is in exact proportion to the requirements at the point of application and dependent upon the leveling of liquid in the still-well.

Figure 4:
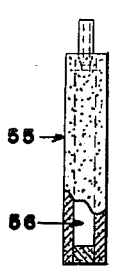
Fig. 4 is a detail of a porous diffusing device used at the point of application in the present system.
Figure 5:
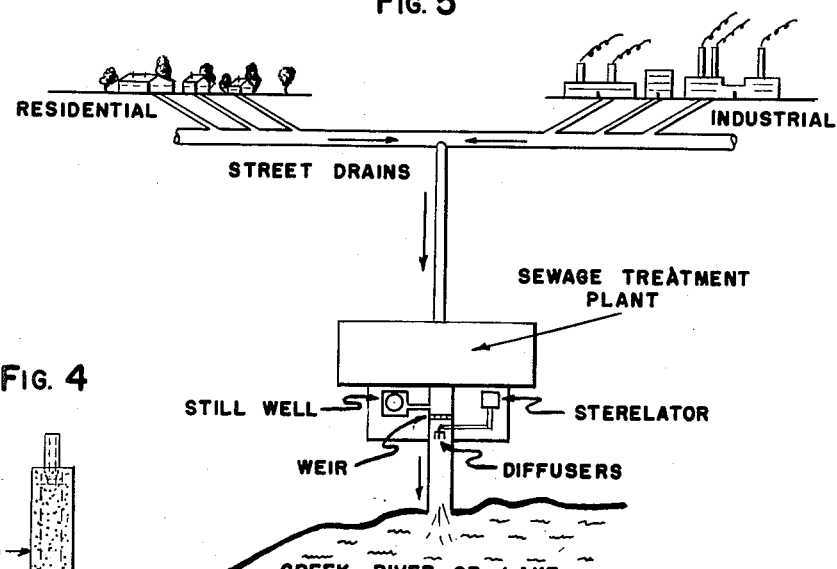
Fig. 5 shows a sewage treatment plan and the arrangement of the present arrangement for disinfecting the effluent.

Branch conduit pipe 19c enters the cabinet X where it is coupled to the gas control valve 60 and a blow off valve 61 and to a hose 45 leading to a visual metering and flow device 46 on the exterior of the cabinet. This flow meter is of the type known as a "rotameter" wherein the tapered tube 47 provides passage for the chlorine gas and the small rotating float 48 rises or falls in the tube to indicate the rate of flow and the like on a scale provided on the tube. At the discharge end of the "rotameter" a hose 49 is coupled thereto and passes through the cabinet and at its outer end it is coupled to another hose 50 leading into the expansion chamber G. It is preferred that the upper portion of expansion chamber G be approximately at the level of the top of cabinet X and said expansion chamber G is arranged with its axis vertical so that the gas passing therethrough moves in a downward direction from the top and then through the bottom where it discharges into a gooseneck or S-shape hose 52 having a check valve 53 therein. The upper reach of the gooseneck hose 52 turns downward and its lower portion is in the channel B of moving liquid for discharge of the gas into said liquid. The means for effecting an equalized discharge of the chlorine gas comprises the arrangement shown in Fig. 1 at the lower end of hose conduit 52. This comprises one or more branches 54 discharging each into a hollow porous diffuser elements 55, one of which is shown in detail in Fig. 4 as comprising the hollow cylinder with a plug at each end to provide a closed chamber 56 to which the chlorine gas is discharged from the conduit hose 52 and seeps out through the spiracles of the porous diffuser and is discharged in the flowing stream of liquid in channel B. The several hose sections are of suitable rubber material and form portions of the conduit which conveys the gas from the source to the point of application and having certain accessories interposed in several sections of the conduit for desired control of the chlorine which is directly fed to the sewage plant effluent as it enters the chlorine contact chamber B.

Whenever a direct feed chlorine control apparatus is shut down and not properly vented, the remaining chlorine gas within the apparatus has a tendency to form or create a vacuum and slowly lift the liquid in channel B upward and into the control units of the apparatus. To prevent this, check valve 53 and conduit 52 is attached to chlorine expansion chamber G as shown in Fig. 1. Whenever liquid is drawn upward from channel B it will create a head on this check valve 53, causing it to seat tighter and prevent passage of liquid beyond that point. Should the check valve 53 allow a minute flow of liquid past the seat, this liquid will be visible in the glass cylinder 61 of the expansion chamber G. This being a very slow process it causes the vacuum created by the chlorine gas to be spent before the glass cylinder 61 would have a chance to completely fill. When the apparatus is again started the liquid in expansion chamber G and conduit 52 will be forced out through the diffusion heads 55 by the flow of chlorine gas.

While this invention has been shown and described in a typical or preferred embodiment, it will be apparent to persons skilled in the art, after understanding the improvements contemplated herein, that changes and modifications thereof may be made therein according to the requirements of each particular installation and without departing from the spirit or scope hereof. It is aimed in the appended claims to cover all such changes and modifications.

What is claimed is:

1. A dry feed system for purifying liquid flowing in a flume the level of which liquid is subject to variation, comprising a weir in the flume providing overflow means for the liquid in the flume; means defining a channel into which overflow from said flume discharges; a container adapted to contain chlorine gas under pressure; a pipe line leading from said container to the point of application providing direct feed of non-liquified chlorine gas into the liquid; regulator valve means in said pipe line for reducing the pressure of the chlorine gas to be fed into the liquid; a goose-neck trap and a check-valve in said pipe line between said regulator valve means and the point of application; an expansion chamber interposed in said pipe line ahead of said gooseneck and check-valve; submerged gas diffuser means in the liquid at the point of application in said channel; and control means in said pipe line for automatically proportioning the flow of chlorine gas to said diffuser means; said control means being responsive to changes of quiescent level of said flume liquid to vary the volume of low pressure chlorine gas which is fed to said diffuser means, and said control means also being effective to shut-off the flow of gas to said diffuser means when the liquid level falls below the lowest level at said weir.

2. The system defined in claim 1 including a quiescent still-well separate from said flume in which variable liquid levels are maintained equal to the liquid levels in said flume ahead of said weir; and a float in the liquid in said still-well and connected to said control means for operating said means.

ROY B. EVERSON.

References Cited in the file of this patent

UNITED STATES PATENTS

| Number | Name | Date |
|---|---|---|
| 1,233,394 | Ornstein | July 12, 1917 |
| 1,283,993 | Wallace et al. | Nov. 5, 1918 |
| 1,468,739 | Paterson | Sept. 25, 1923 |
| 1,582,715 | Wensley | Apr. 27, 1926 |
| 1,840,225 | Chamberlin | Jan. 5, 1932 |
| 1,923,044 | Baker | Aug. 15, 1933 |
| 1,998,250 | Peet | Apr. 16, 1935 |
| 2,260,936 | Everson | Oct. 28, 1941 |
| 2,315,512 | Everson | Apr. 6, 1943 |